(12) United States Patent
Miriani et al.

(10) Patent No.: US 9,528,005 B1
(45) Date of Patent: Dec. 27, 2016

(54) LIQUID RUBBER COMPOSITION

(71) Applicant: Swift IP, LLC, Weston, FL (US)

(72) Inventors: Anthony Miriani, Sterling Heights, MI (US); Philip Swift, Weston, FL (US); Michal Dewald, Elgin, IL (US)

(73) Assignee: Swift IP, LLC, Weston, FL (US)

( * ) Notice: Subject to any disclaimer, the term of this patent is extended or adjusted under 35 U.S.C. 154(b) by 0 days.

(21) Appl. No.: 14/980,915

(22) Filed: Dec. 28, 2015

(51) Int. Cl.
| | |
|---|---|
| *C08K 3/34* | (2006.01) |
| *C09D 5/00* | (2006.01) |
| *C09D 171/00* | (2006.01) |
| *C08K 13/02* | (2006.01) |
| *C08K 3/36* | (2006.01) |
| *C08L 71/02* | (2006.01) |
| *C08L 71/00* | (2006.01) |
| *C08L 83/12* | (2006.01) |

(52) U.S. Cl.
CPC ............. *C09D 5/00* (2013.01); *C09D 171/00* (2013.01); *C08K 3/34* (2013.01); *C08K 3/346* (2013.01); *C08K 3/36* (2013.01); *C08K 13/02* (2013.01); *C08L 71/00* (2013.01); *C08L 71/02* (2013.01); *C08L 83/12* (2013.01)

(58) Field of Classification Search
CPC ......... C09D 5/00; C09D 171/00; C08K 13/02; C08K 3/36; C08K 3/346; C08K 3/34; C08L 71/02; C08L 71/00; C08L 83/12

See application file for complete search history.

(56) References Cited

U.S. PATENT DOCUMENTS

| | | |
|---|---|---|
| 4,020,029 A | 4/1977 | Gorbunow |
| 4,290,811 A | 9/1981 | Brown et al. |
| 4,294,619 A | 10/1981 | Dulaney et al. |
| 4,329,247 A | 5/1982 | Palmer |
| 4,518,734 A | 5/1985 | Brouillette et al. |
| 4,536,454 A | 8/1985 | Haasl |
| 4,745,139 A | 5/1988 | Haasl et al. |
| 4,857,578 A | 8/1989 | Hall |
| 4,922,845 A | 5/1990 | Boyd |
| 5,192,608 A | 3/1993 | Haasl et al. |
| 5,256,716 A | 10/1993 | Haasl et al. |
| 5,314,940 A | 5/1994 | Stone |
| 5,456,853 A | 10/1995 | Myers, II |
| 6,030,466 A | 2/2000 | Myers, II |
| 6,905,274 B2 | 6/2005 | Zwaert et al. |
| 7,959,040 B2 | 6/2011 | Heirman |
| 2005/0226677 A1 | 10/2005 | Zwaert et al. |
| 2008/0190968 A1 | 8/2008 | Heirman |
| 2011/0105647 A1 | 5/2011 | Kuster-Kosmoski et al. |
| 2011/0166280 A1* | 7/2011 | Davio ............... C08L 83/04 524/447 |
| 2011/0178220 A1* | 7/2011 | Davio ............... C08L 83/04 524/425 |
| 2012/0142857 A1* | 6/2012 | Hatanaka ........... C08G 65/336 524/789 |
| 2014/0183222 A1 | 7/2014 | Morrison et al. |
| 2014/0205804 A1 | 7/2014 | Jones et al. |
| 2015/0005424 A1 | 1/2015 | Jones et al. |
| 2015/0072079 A1* | 3/2015 | Bourbigot ............ C09D 5/185 427/373 |

OTHER PUBLICATIONS

LeakSeal Clear MSDS—Safety Data Sheet printed Apr. 29, 2015, Rust-Oleum Corporation for STRUST SSPR 6PK Leak Seal Clear.
LeakSeal Black MSDS—Safety Data Sheet printed May 15, 2015—Rust-Oleum Corporation for Strust SSPR 6PK Leak Seal Black.
LeakSeal Aluminum MSDS—Safety Data Sheet printed May 15, 2015—Rust-Oleum for Strust SSPR 6PK Leak Seal Aluminum.
LeakSeal White MSDS—Safety Data Sheet printed Sep. 25, 2015—Rust-Oleum for Strust SSPR 6PK Leak Seal White.
LeakSeal Brown MSDS—Safety Data Sheet printed Sep. 4, 2015—Rust-Oleum for Strust SSPR 6PK Leak Seal Brown.
250 HS SDS—Safety Data Sheet dated Feb. 2015—Instcoat Premium Products for 250 HS Solvent-Free Coating.
250 HS Silicone 5 gal—Instacoat Premium Products—250 HS Silicone.
250 HS Silicone 2012—Instacoat Premium Products.

* cited by examiner

*Primary Examiner* — Margaret Moore
(74) *Attorney, Agent, or Firm* — Banner & Witcoff, Ltd.

(57) ABSTRACT

Liquid rubber compositions are particularly formulated for use in repair or modification of various household items, hand tools, garden tools, cooking or eating utensils, sports equipment, motor vehicles, appliances, etc. The compositions may be applied by brushing, dipping, or coating. Once cured, the composition forms a durable, breathable, weatherproof barrier that is resistant to rain, snow, sun, wind, air moisture, UV degradation, and natural weathering over a wide temperature range. The composition contains a polyether having silane terminal groups, a mineral filler, a fluid carrier, a crosslinker, fumed silica and a catalyst in specific amounts. It can also contain a colorant.

17 Claims, No Drawings

LIQUID RUBBER COMPOSITION

BACKGROUND

Liquid rubber compositions have been used commercially by professionals in roofing applications for waterproofing. Such compositions are neither intended nor particularly well-suited for general consumer use. It would be desirable to develop liquid rubber compositions which are more suitable for general consumer use, e.g., for application to various household articles, sporting equipment, motor vehicles, appliances, and the like, in order to repair leaks or to modify physical properties of the article, such as imparting water-resistance, thermal insulation, shock resistance, vibration resistance/noise reduction, electrical insulation, non-slip properties, and the like. It would be particularly desirable to develop liquid rubber compositions which are non-toxic, easy-to-use, and environmentally friendly.

SUMMARY

Liquid rubber compositions described herein are particularly formulated for general consumer use in the repair or modification of various household items, hand tools, garden tools, cooking or eating utensils, sports equipment, automobiles, boats, air conditioners, furnaces, and the like. The compositions may be applied easily by brushing, dipping, coating, pouring or the like. The compositions are non-toxic, environmentally friendly, food-grade and food-safe, and fishbowl-safe. Once cured, the composition forms a durable, breathable, weatherproof barrier that is resistant to rain, snow, sun, wind, air moisture, UV degradation, and natural weathering over a wide temperature range.

DETAILED DESCRIPTION

Unless otherwise clear from context, all percentages referred to herein are expressed as percent by weight based on the total weight of the composition.

The liquid rubber compositions described herein generally are formulated to be viscous though in the liquid phase at room temperature. The composition includes at least one synthetic rubber component that includes a polyether-based silane-terminated polymer. The composition typically includes a number of other components, such as mineral fillers, fluid carriers, crosslinking agents, catalysts, and colorants. The composition are solvent-less and are formulated to cure by crosslinking when exposed to moisture in the environment. The compositions may be applied to various articles to provide water-resistance, thermal insulation, shock resistance, vibration resistance/noise reduction, electrical insulation, and/or non-slip properties.

The liquid rubber composition may be provided in a ready-to-use state, e.g., such that no mixing of components is needed. The composition may be brushed or rolled onto an article, or poured directly from its container onto an article. Alternatively, articles may be dipped into a container containing the composition. The composition generally has relatively high viscosity that allows for single or multiple coat application and resists running, dripping, and sagging.

The composition includes a liquid rubber component which is a polyether-based silane-terminated polymer. One example of a suitable polyether-based silane-terminated polymer is Geniosil® WP 1, available from Wacker Chemie AG. As compared to other silylated polymers, the Geniosil® WP 1 polymer has relatively high reactivity due to the structural proximity of the nitrogen atom to the silicon atom in the dimethoxy(methyl) silyl-methylcarbamate group. This is the so-called alpha-effect. The polymer hydrolyzes in the presence of moisture to finally form a stable siloxane network initiated by mild catalysis. Suitable catalysts include 2-butanone,O,O',O"-(methylsilylidyne)trioxime and 2-butanone,O,O',O"-silanetetrayltetraoxime, the latter of which also functions as a water scavenger. The amount of polyether-based silane-terminated polymer often ranges from about 55 wt. % to about 58 wt. % based on the total weight of the composition. The amount of catalyst often ranges from about 0.1 wt. % to about 0.3 wt. % based on the total weight of the composition.

The composition also contains one or more mineral fillers, which in general may increase viscosity, opacity, and weight. The use of mineral fillers will also affect physical strength and vibration damping. The feldspar minerals include sodium, potassium and calcium aluminosilicates. Their ores are commonly associated with quartz and mica, and may also contain spodumene (a lithium aluminosilicate), kaolin, garnet, or iron minerals, depending on the type of deposit. Feldspars are commonly differentiated according to the dominant alkali. For example, orthoclase and microcline, containing at least 8% potassium (e.g., 10% $K_2O$), are called potassium or potash feldspars. Albite, containing at least 5% sodium (e.g., 7% $Na_2O$), is a sodium or soda feldspar. Anorthite, containing at least 12.5% calcium (e.g., 20% CaO), is a calcium feldspar. Most commercial feldspars are produced by flotation and magnetic separation followed by milling.

The liquid rubber composition disclosed herein employs a mineral filler which is nepheline syenite, a rock composed of sodium- and potassium feldspars and nepheline. Nepheline is nominally a sodium aluminosilicate, but potassium invariably substitutes for a portion of the sodium. The amount of potassium in natural nephelines ranges from 2.5 to 10% (e.g., 3 to 12% $K_2O$) by weight. The nepheline structure is based on six-member corner-linked rings of silica tetrahedra, with apices alternating in direction, forming hexagonal and polygonal voids. $Al^{3+}$ replaces $Si^{4+}$ in half the tetrahedra, with the charge imbalance compensated for by $Na^+$ and $K^+$. The amount of mineral filler often ranges from about 23 wt. % to about 29 wt. % based on the total weight of the composition.

The composition also contains a fluid carrier. Fluid carriers that may be used include cyclomethicones, which are a group of methyl siloxanes, a class of liquid silicones (cyclic polydimethylsiloxane polymers) that possess the characteristics of low viscosity and high volatility. Cyclomethicones have short backbones that make closed or nearly-closed rings with their methyl groups. Octamethylcyclotetrasiloxane, also called D4, is an organosilicon compound with the formula $[(CH_3)_2SiO]_4$ that generally is less volatile than other cyclomethicones. The amount of fluid carrier used normally is about 7 wt. % based on the total weight of the composition.

The composition also contains fumed amorphous silica, which functions as a thixotropic agent, which causes the formulation to transform from a gel to a liquid when moved. Fumed silica normally is present in an amount of about 2 wt. % for this purpose.

The composition also may contain one or more colorants depending on the desired product color. For example, compositions may be clear, white, off-white, black, gray, blue, green, red, almond, brown, silver, yellow, terra cotta, or other suitable colors. The selection of appropriate pigment(s) or other colorant(s) needed to achieve a desired color will be apparent to persons skilled in the art. For example, titanium dioxide may be added to provide a white color. Carbon black may be added to provide a black color. Both titanium dioxide and carbon black may be added to provide a gray color. Other suitable colorants may be used to achieve a liquid rubber composition having a desired color. The amount of individual colorants usually ranges from 0 to about 9 wt. %, often from about 2 wt. % to about 8 wt. %, based on the total weight of the composition.

The following examples are illustrative of certain aspects of the invention and should not be regarded as limiting the spirit or scope of the present invention.

EXAMPLE 1

This example illustrates preparing a clear liquid rubber composition having a viscosity ranging from 150 ku to 155 ku and a specific gravity of 1.26. The following components were compounded and blended in the amounts indicated.

| Component | Role | Wt. |
|---|---|---|
| Geniosil WP 1 (Wacker) | Liquid hybridpolymer | 58 |
| Nepheline Syenite | Mineral Filler | 29 |
| Octamethylcyclotetrasiloxane | Fluid Carrier | 7 |
| 2-Butanone, O,O',O"-(Methylsilylidyne)Trioxime | Crosslinker | 3.3 |
| 2-Butanone, O,O',O"-silanetetrayltetraoxime | Crosslinker/Water Scavenger | 0.5 |
| Silica, Amorphous, fumed, crystal-free | Thixotropic | 2 |
| 3-Aminopropyltriethoxysilane | Catalyst | 0.2 |

EXAMPLE 2

This example illustrates preparing a white-colored liquid rubber composition having a viscosity ranging from 150 ku to 155 ku and a specific gravity of 1.24. The following components were compounded and blended in the amounts indicated.

| Component | Role | Wt. % |
|---|---|---|
| Geniosil WP 1 (Wacker) | Liquid hybridpolymer | 55 |
| Nepheline Syenite | Mineral Filler | 23 |
| Titanium Dioxide | Colorant Filler | 9 |
| Octamethyl cyclotetrasiloxane | Fluid Carrier | 7 |
| 2-Butanone, O,O',O"-(Methylsilylidyne)Trioxime | Crosslinker | 3.3 |
| 2-Butanone, O,O',O"-silanetetrayltetraoxime | Crosslinker/Water Scavenger | 0.5 |
| Silica, Amorphous, fumed, crystal-free | Thixotropic | 2 |
| 3-Aminopropyltriethoxysilane | Catalyst | 0.2 |

EXAMPLE 3

This example illustrates preparing a black-colored liquid rubber composition having a viscosity ranging from 150 ku to 155 ku and a specific gravity of 1.24. The following components were compounded and blended in the amounts indicated.

| Component | Role | Wt. % |
|---|---|---|
| Geniosil WP 1 (Wacker) | Liquid hybridpolymer | 55 |
| Nepheline Syenite | Mineral Filler | 24 |
| Carbon Black | Colorant Filler | 8 |
| Octamethylcyclotetrasiloxane | Fluid Carrier | 7 |
| 2-Butanone, O,O',O"-(Methylsilylidyne)Trioxime | Crosslinker | 3.3 |
| 2-Butanone, O,O',O"-silanetetrayltetraoxime | Crosslinker/Water Scavenger | 0.5 |
| Silica, Amorphous, fumed, crystal-free | Thixotropic | 2 |
| 3-Aminopropyltriethoxysilane | Catalyst | 0.2 |

EXAMPLE 4

This example illustrates preparing a gray-colored liquid rubber composition having a viscosity ranging from 150 ku to 155 ku and a specific gravity of 1.24. The following components were compounded and blended in the amounts indicated.

| Component | Role | Wt. % |
|---|---|---|
| Geniosil WP 1 (Wacker) | Liquid hybridpolymer | 55 |
| Nepheline Syenite | Mineral Filler | 23 |
| Titanium Dioxide | Colorant Filler | 7 |
| Carbon Black | Colorant Filler | 2 |
| Octamethylcyclotetrasiloxane | Fluid Carrier | 7 |
| 2-Butanone, O,O',O"-(Methylsilylidyne)Trioxime | Crosslinker | 3.3 |
| 2-Butanone, O,O',O"-silanetetrayltetraoxime | Crosslinker/Water Scavenger | 0.5 |
| Silica, Amorphous, fumed, crystal-free | Thixotropic | 2 |
| 3-Aminopropyltriethoxysilane | Catalyst | 0.2 |

The foregoing description should be considered illustrative rather than limiting. It should be recognized that various modifications can be made without departing from the spirit or scope of the invention as described and claimed herein.

What is claimed is:

1. A clear liquid rubber composition comprising:
   about 58 wt. % polyether-based silane-terminated polymer;
   about 29 wt. % mineral filler;
   about 7 wt. % fluid carrier;
   about 3.8 wt. % crosslinker;
   about 2 wt. % amorphous fumed silica; and
   about 0.2 wt. % catalyst.

2. The liquid rubber composition of claim 1, wherein the mineral filler is nepheline syenite.

3. The liquid rubber composition of claim 1, wherein the fluid carrier is octamethylcyclotetrasiloxane.

4. The liquid rubber composition of claim 1, wherein the crosslinker comprises about 3.3 wt. % of 2-butanone,O,O',O"-(methylsilylidyne)trioxime and about 0.5 wt. % of 2-butanone, O,O',O"-silanetetrayltetraoxime.

5. The liquid rubber composition of claim 1, wherein the catalyst is 3-aminopropyl-triethoxysilane.

6. The liquid rubber composition of claim 1 which has a viscosity ranging from about 150 ku to about 155 ku.

7. The liquid rubber composition of claim 1 which has a specific gravity of about 1.26.

8. A colored liquid rubber composition comprising:
   about 55 wt. % polyether-based silane-terminated polymer;
   about 23-24 wt. % mineral filler;
   about 8-9 wt. % colorant;
   about 7 wt. % fluid carrier;
   about 3.8 wt. % crosslinker;
   about 2 wt. % amorphous fumed silica; and
   about 0.2 wt. % catalyst.

9. The liquid rubber composition of claim 8, wherein the mineral filler is nepheline syenite.

10. The liquid rubber composition of claim 8, wherein the fluid carrier is octamethylcyclotetrasiloxane.

11. The liquid rubber composition of claim 8, wherein the crosslinker comprises about 3.3 wt. % of 2-butanone,O,O', O"-(methylsilylidyne)trioxime and about 0.5 wt. % of 2-butanone, O,O',O"-silanetetrayltetraoxime.

12. The liquid rubber composition of claim 8, wherein the catalyst is 3-aminopropyl-triethoxysilane.

13. The liquid rubber composition of claim 8, wherein the colorant comprises about 9 wt. % titanium dioxide.

14. The liquid rubber composition of claim 8, wherein the colorant comprises about 8 wt. % carbon black.

15. The liquid rubber composition of claim 8, wherein the colorant comprises about 7 wt. % titanium dioxide and about 2 wt. % carbon black.

16. The liquid rubber composition of claim 8 which has a viscosity ranging from about 150 ku to about 155 ku.

17. The liquid rubber composition of claim 8 which has a specific gravity of about 1.24.

\* \* \* \* \*